(12) United States Patent
Albero et al.

(10) Patent No.: US 12,045,359 B2
(45) Date of Patent: Jul. 23, 2024

(54) RECURSIVE DATA AND ELECTRONIC SIGNATURE DOCUMENT UPDATER

(71) Applicant: Bank of America Corporation, Charlotte, NC (US)

(72) Inventors: George Albero, Charlotte, NC (US); Maharaj Mukherjee, Poughkeepsie, NY (US); Elijah Clark, Charlotte, NC (US); Hannah Kaplan, Denver, CO (US)

(73) Assignee: Bank of America Corporation, Charlotte, NC (US)

( * ) Notice: Subject to any disclaimer, the term of this patent is extended or adjusted under 35 U.S.C. 154(b) by 329 days.

(21) Appl. No.: 17/523,278

(22) Filed: Nov. 10, 2021

(65) Prior Publication Data

US 2023/0145722 A1 May 11, 2023

(51) Int. Cl.
  *G06F 21/62* (2013.01)
  *G06F 16/93* (2019.01)
  *G06F 40/194* (2020.01)

(52) U.S. Cl.
  CPC .......... *G06F 21/6209* (2013.01); *G06F 16/93* (2019.01); *G06F 40/194* (2020.01)

(58) Field of Classification Search
  CPC ..... G06F 21/6209; G06F 16/93; G06F 40/194
  USPC ......................................................... 726/28
  See application file for complete search history.

(56) References Cited

U.S. PATENT DOCUMENTS

| | | | |
|---|---|---|---|
| 6,879,997 B1 | 4/2005 | Ketola et al. | |
| 7,370,034 B2 | 5/2008 | Franciosa et al. | |
| 7,493,322 B2 | 2/2009 | Franciosa et al. | |
| 7,617,195 B2 | 11/2009 | Liang et al. | |
| 7,818,293 B2 | 10/2010 | Dullanty et al. | |
| 7,895,512 B2 | 2/2011 | Roberts | |
| 8,396,894 B2 | 3/2013 | Jacobson et al. | |
| 8,442,982 B2 | 5/2013 | Jacobson et al. | |
| 8,751,465 B2 | 6/2014 | Fukuoka | |
| 8,775,465 B2 | 7/2014 | Peyrichoux et al. | |
| 8,914,414 B2 | 12/2014 | Jacobson et al. | |
| 9,009,201 B2 | 4/2015 | Jacobson et al. | |
| 9,330,377 B2 | 5/2016 | Poth et al. | |
| 10,382,547 B2 | 8/2019 | Berger et al. | |
| 10,425,496 B2 | 9/2019 | Bedi et al. | |
| 10,681,133 B2 | 6/2020 | Puleston et al. | |

(Continued)

*Primary Examiner* — Zi Ye

(74) *Attorney, Agent, or Firm* — Banner & Witcoff, Ltd.

(57) ABSTRACT

Aspects of the disclosure relate to computing hardware and software for performing uniform document updates. A computing platform may receive, from a user device, a document change request. The computing platform may authenticate authority of a user of the user device to perform the document change request. Based on authenticating the authority of the user of the user device to perform the document change request, the computing platform may identify storage locations at which documents that are affected by the document change request are located. The computing platform may access the documents at each of the storage locations. The computing platform may scan the documents to identify locations, within the documents, of changes to be made, which may include identifying the locations based on enterprise-adopted change tags. The computing platform may write the changes to the documents at the identified locations based on the enterprise-adopted change tags.

20 Claims, 9 Drawing Sheets

(56) References Cited

U.S. PATENT DOCUMENTS

| | | |
|---|---|---|
| 10,846,466 B2 | 11/2020 | Vinay et al. |
| 10,958,753 B2 | 3/2021 | Bedi et al. |
| 11,019,144 B2 | 5/2021 | Berger et al. |
| 11,108,863 B2 | 8/2021 | Puleston et al. |
| 2008/0104501 A1 | 5/2008 | Sattler et al. |
| 2014/0373108 A1* | 12/2014 | Bailor ................. G06F 16/1767 726/4 |
| 2016/0224523 A1* | 8/2016 | Shimkus ............ G06Q 30/0613 |
| 2016/0315775 A1* | 10/2016 | Follis ..................... G06F 21/31 |

* cited by examiner

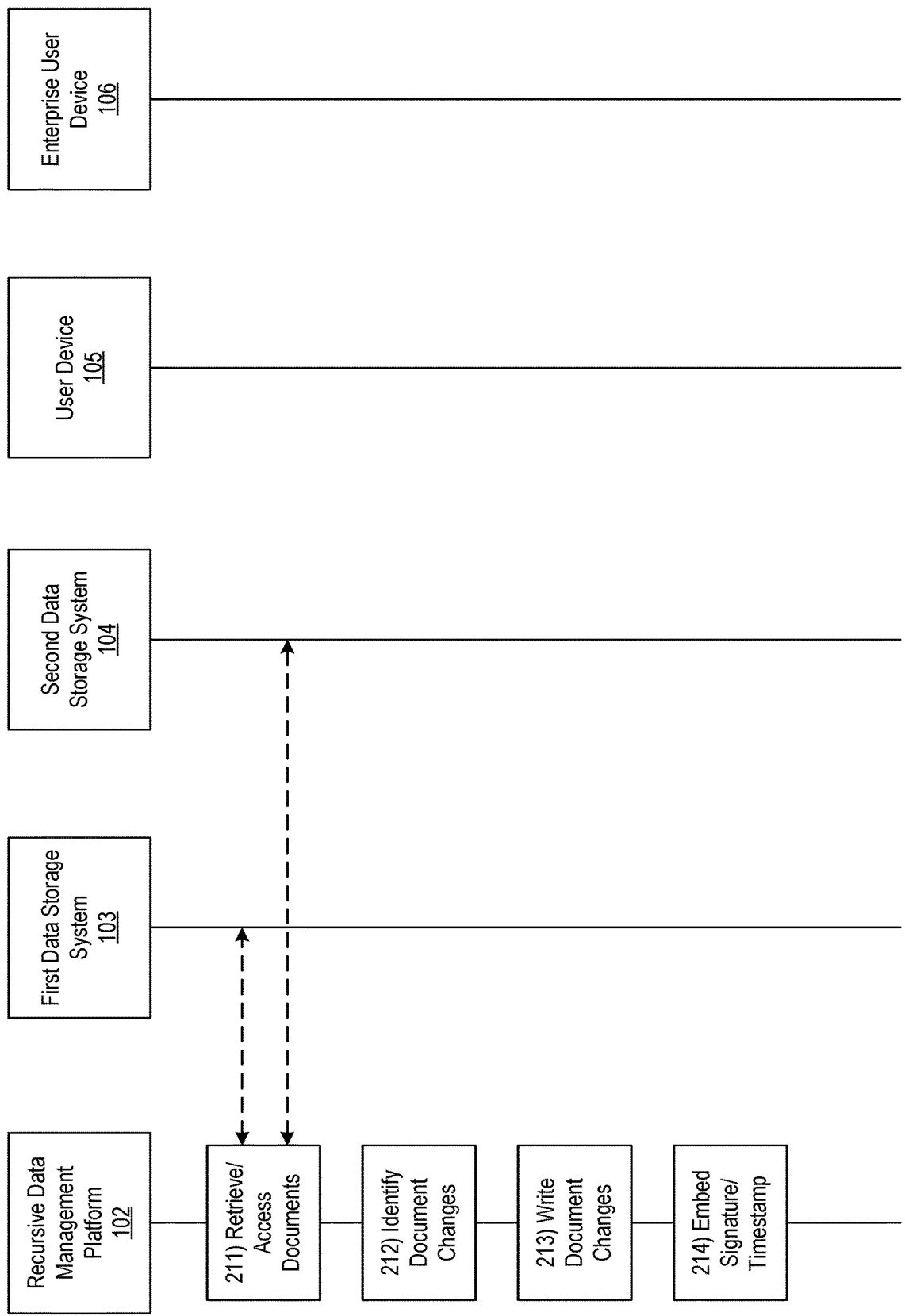

RECURSIVE DATA AND ELECTRONIC SIGNATURE DOCUMENT UPDATER

BACKGROUND

Aspects of the disclosure relate to computing hardware and software, particularly distributed computing hardware and software for synchronizing document versions. When an electronic document is downloaded to a particular network device (or a number of network devices), multiple versions of the electronic document may be created. For example, each download may result in a new copy of the electronic document. If changes to the document are needed, each version of the document must be revised accordingly to perform an enterprise wide update. This may be a time consuming and computationally expensive process, which may ultimately be error prone due to the likelihood of one or more versions of the document avoiding update (especially when various versions of the document are stored at different locations). Accordingly, this may result in difficulties with version control across an enterprise. It is therefore important to identify a reliable method for automatically making such updates across all existing copies of a document.

SUMMARY

Aspects of the disclosure provide effective, efficient, scalable, and convenient technical solutions that address and overcome the technical problems associated with developing and implementing computer hardware and software that automatically updates versions of a document, stored at different locations, based on a request to update the document. In accordance with one or more embodiments of the disclosure, a computing platform comprising at least one processor, a communication interface, and memory storing computer-readable instructions may receive, from a user device, a document change request. The computing platform may authenticate authority of a user of the user device to perform the document change request. Based on authenticating the authority of the user of the user device to perform the document change request, the computing platform may identify a plurality of storage locations at which documents that are affected by the document change request are located. The computing platform may access the documents at each of the plurality of storage locations. The computing platform may scan the documents to identify locations, within the documents, of changes to be made, which may include identifying the locations based on one or more enterprise-adopted change tags. The computing platform may write the changes to the documents at the identified locations based on the one or more enterprise-adopted change tags. The computing platform may embed, in the documents, a timestamp corresponding to implementation of the changes and a signature of the user. The computing platform may send, to the user device, a change notification, indicating that the document change request has been completed, and one or more commands directing the user device to display the change notification, which may cause the user device to display the change notification and information associated with the one or more enterprise-adopted change tags.

In one or more instances, the computing platform may store one or more original documents. The computing platform may embed, into the one or more original documents, the one or more enterprise-adopted change tags indicating portions of the one or more original documents to be modified upon receipt of each of a plurality of requested document changes.

In one or more instances, writing the changes to the documents may include writing, to the one or more enterprise-adopted change tags of original documents linked to the documents, the changes. In one or more instances, the document change request may indicate a particular document to be modified.

In one or more instances, the computing platform may identify the plurality of storage locations at which the documents that are affected by the document change request are located by identifying storage locations of available versions of the particular document. In one or more instances, the document change request may indicate a particular change to be made.

In one or more instances, identifying the plurality of storage locations at which the documents that are affected by the document change request are located may include identifying documents including information to be changed based on the particular change. In one or more instances, the computing platform may identify, based on enterprise information, additional changes to be made, which may further be based on the additional changes.

In one or more instances, the enterprise information may indicate one or more of: an enterprise policy change, an enterprise name change, or a change in enterprise personnel. In one or more instances, the computing platform may lock, while the changes are being written to the documents at the identified locations based on the one or more enterprise-adopted change tags, the documents for editing.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for performing recursive data and electronic signature updates to documents in accordance with one or more example embodiments;

DETAILED DESCRIPTION

Figure 1A:
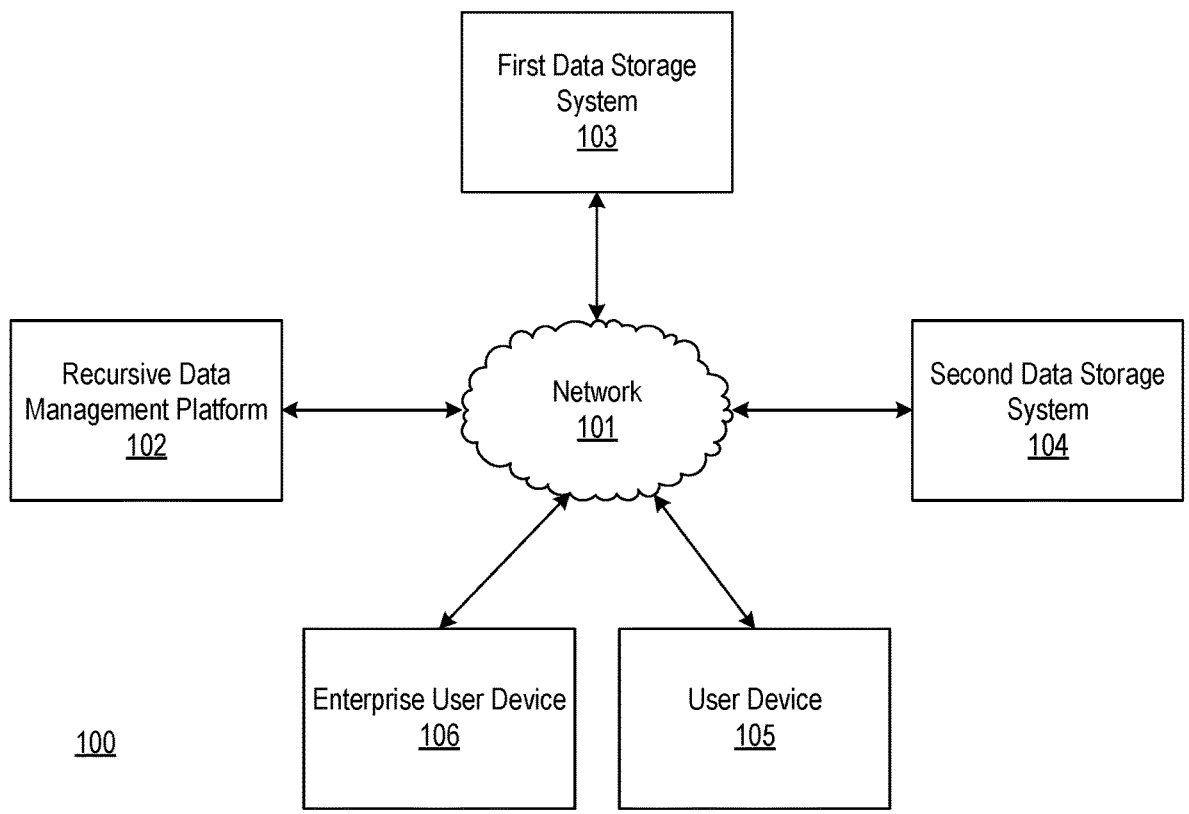
FIGS. 1A-1B depict an illustrative computing environment configured to perform recursive data and electronic signature updates to documents in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to an improved process for writing changes throughout multiple documents at various storage locations. For example, currently, there is no efficient and effective automated solution for updating, changing, correcting, and/or otherwise editing documents, playbooks, and/or other files across an enterprise (which may, e.g., be located in various different storage locations). The recursive data and electronic signature updater may search a complete repository of all documents and make necessary changes to ensure compliance, accuracy, and standardization across the enterprise. For example, an enterprise may change its name and/or logo. Additionally or alternatively, a legal or regulatory change may require consistent updates in enterprise materials stored across various systems and databases. In these instances, the recursive updater may change all documents to reflect the change(s). In some instances, the recursive updated may change only tagged or otherwise linked documents.

As another example, changes may be made to a playbook or procedures manual. The updater may fix all copies of the playbook/procedure's manual and affix a date/time stamp in the appropriate section. In some instances, the updater may also append an electronic signature of the person who initiated the update. In some instances, individuals may opt into such updates.

As yet another example, information may be added to a document that changes the document's overall classification. In these instances, the updater may correct the header/footer data and/or a controlling slide.

In some instances, pictures may be updated and/or formatted in addition or as an alternative to text. In some instances, a document may be locked and/or markers indicating that the document should not be changed may be inserted during editing. In one or more instances, notifications may be sent to a document owner to assist with version control.

In some instances, template changes, logos, and/or other objects may be formatted to account for copy/pasting documents together.

In some instances, in the case of third party contracts, acquisitions, spin-offs, and/or other enterprise organizational changes, enterprise information may be updated throughout any affected documents. Furthermore, all terms and conditions may be updated accordingly, including flagging terms and/or conditions that might not apply as a result of the update(s). As a specific example, company X may have a patent contract with company Y, where companies X and Y licensed each other their patents. Now, company Y may acquire company Z, which might not have had any original licensing contract with company X. As a result of this change in company Z (as part of company Y now), vulnerabilities may be identified with regard to the patent contract with company X.

Accordingly, described herein is an enterprise document update crawler for all copies of a document to ensure compliance, accuracy, and standardization regardless of where the document resides on the network.

These and other features are described in further detail below.

Figure 1B:
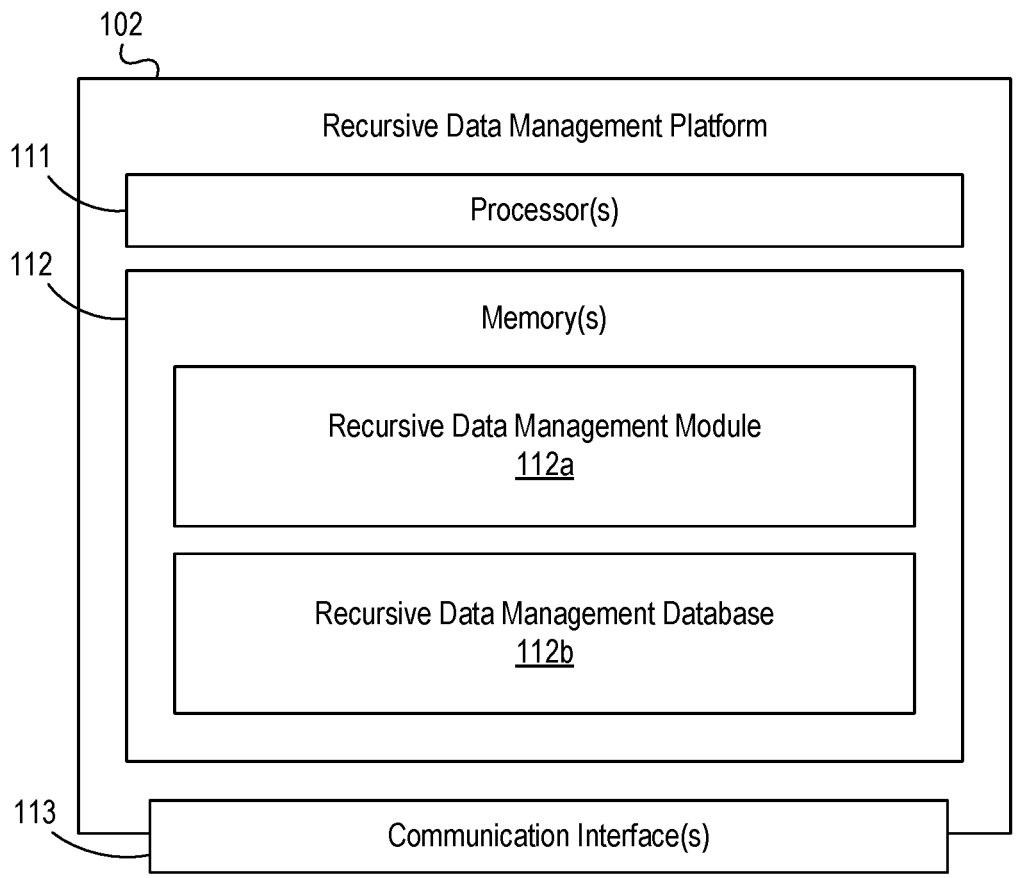

FIGS. 1A-1B depict an illustrative computing environment that performs recursive data and electronic signature updates to documents in accordance with one or more example embodiments. Referring to FIG. 1A, computing environment 100 may include one or more computer systems. For example, computing environment 100 may include recursive data management platform 102, first data storage system 103, second data storage system 104, user device 105, and enterprise user device 106.

As described further below, recursive data management platform 102 may be a computer system that includes one or more computing devices (e.g., servers, server blades, or the like) and/or other computer components (e.g., processors, memories, communication interfaces) that may be used to recursively identify documents to be updated and write the updates to the documents accordingly. In some instances, the recursive data management platform 102 may be integrated into a user device or otherwise integrated into a peer-to-peer network.

First data storage system 103 may be one or more computing devices (e.g., servers, server blades, laptop computers, desktop computers, mobile devices, tablets, smartphones, servers, and/or other devices configured for document storage). In some instances, the first data storage system 103 may be configured to store documents for subsequent access (e.g., by an enterprise employee or other individual).

Second data storage system 104 may be one or more computing devices (e.g., servers, server blades, laptop computers, desktop computers, mobile devices, tablets, smartphones, servers, and/or other devices configured for document storage). In some instances, the second data storage system 104 may be configured to store documents for subsequent access (e.g., by an enterprise employee or other individual).

User device 105 may be a laptop computer, desktop computer, mobile device, tablet, smartphone, wearable device, and/or other device that may be used by an individual (such as an employee of an enterprise organization) to access documents and/or request changes to the documents. In some instances, user device 105 may be configured to display one or more user interfaces (e.g., document modification interfaces, change notification interfaces, or the like).

Enterprise user device 106 may be a laptop computer, desktop computer, mobile device, tablet, smartphone, wearable device, and/or other device that may be used by an individual (such as a network administrator or security analyst of an enterprise organization) to access a log of document modifications (e.g., to identify unauthorized modifications). In some instances, enterprise user device 106 may be configured to display one or more user interfaces (e.g., change notification interfaces, or the like).

Computing environment 100 also may include one or more networks, which may interconnect recursive data management platform 102, first data storage system 103, second data storage system 104, user device 105, and/or enterprise user device 106. For example, computing environment 100 may include a network 101 (which may interconnect, e.g., recursive data management platform 102, first data storage system 103, second data storage system 104, user device 105, and/or enterprise user device 106).

In one or more arrangements, recursive data management platform 102, first data storage system 103, second data storage system 104, user device 105, and/or enterprise user device 106 may be any type of computing device capable of sending and/or receiving requests and processing the requests accordingly. For example, recursive data management platform 102, first data storage system 103, second data storage system 104, user device 105, enterprise user device 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of recursive data management platform 102, first data storage system 103, second data storage system 104, user device 105, and/or enterprise user device 106 may, in some instances, be special-purpose computing devices configured to perform specific functions.

Referring to FIG. 1B, recursive data management platform 102 may include one or more processors 111, memory 112, and communication interface 113. A data bus may interconnect processor 111, memory 112, and communication interface 113. Communication interface 113 may be a network interface configured to support communication between recursive data management platform 102 and one or more networks (e.g., network 101, or the like). Memory 112 may include one or more program modules having instructions that when executed by processor 111 cause recursive data management platform 102 to perform one or more functions described herein and/or one or more databases that may store and/or otherwise maintain information which may be used by such program modules and/or processor 111. In some instances, the one or more program modules and/or databases may be stored by and/or maintained in different memory units of recursive data management platform 102 and/or by different computing devices that may form and/or otherwise make up recursive data management platform 102. For example, memory 112 may have, host, store, and/or include recursive data management module 112a and/or recursive data management database 112b.

Recursive data management module 112a may have instructions that direct and/or cause recursive data management platform 102 to train, implement, and/or otherwise identify and update documents, as discussed in greater detail below. Recursive data management database 112b may store information used by recursive data management module 112a and/or recursive data management platform 102 in application of advanced techniques to identify documents to be updated, write the updates to the documents, and/or in performing other functions.

Figure 2A:
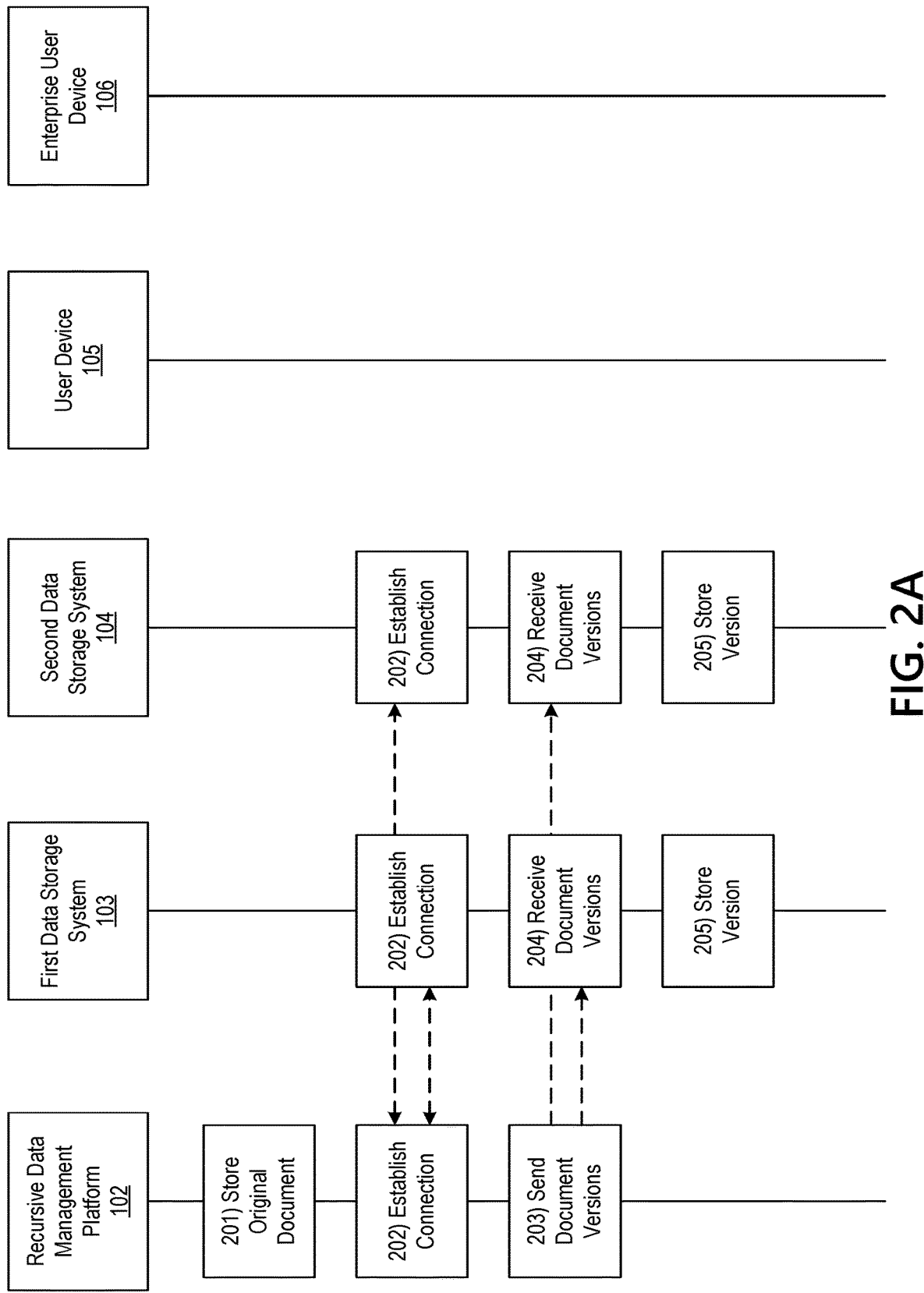

FIGS. 2A-2E depict an illustrative event sequence for performing recursive data and electronic signature updates to documents in accordance with one or more example embodiments. Referring to FIG. 2A, at step 201, the recursive data management platform 102 may store one or more original documents. For example, the recursive data management platform 102 may store contracts, agreements, employee handbooks, and/or other documents for an enterprise organization. In some instances, in storing the one or more original documents, the recursive data management platform 102 may embed, into the original documents, one or more enterprise adopted change tags, pointers, and/or other indicators identifying portions of the original documents that may be changed based on certain input and/or other criteria.

At step 202, the recursive data management platform 102 may establish wired and/or wireless data connections with the first data storage system 103 and/or the second data storage system 104. For example, the recursive data management platform 102 may establish first and/or second wired and/or wireless data connections with the first data storage system 103 and/or the second data storage system 104 to link the recursive data management platform 102 to the first data storage system 103 and/or the second data storage system 104 (e.g., in preparation for sending versions of the one or more original documents). In some instances, the recursive data management platform 102 may identify whether or not a connection is already established with the first data storage system 103 and/or the second data storage system 104. If a connection is already established with the first data storage system 103 and/or the second data storage system 104, the recursive data management platform 102 might not re-establish the connection. If a connection is not yet established with the first data storage system 103 and/or the second data storage system 104, the recursive data management platform 102 may establish the first and/or second wireless data connection as described herein.

At step 203, the recursive data management platform 102 may send the one or more versions of the one or more original documents to the first data storage system 103 and/or the second data storage system 104. For example, the recursive data management platform 102 may send the one or more versions of the one or more original documents to the first data storage system 103 and/or the second data storage system 104 via the communication interface 113 and while the first and/or second wired and/or wireless data connections are established.

At step 204, first data storage system 103 and/or second data storage system 104 may receive the one or more versions of the one or more original documents sent at step 203. For example, the first data storage system 103 and/or second data storage system 104 may receive the one or more versions of the one or more original documents while the first and/or second wired and/or wireless data connections are established.

At step 205, first data storage system 103 and/or the second data storage system 104 may store the one or more versions of the one or more original documents received at step 204. For example, the first data storage system 103 and/or the second data storage system 104 may store the one or more versions of the one or more original documents along with the one or more enterprise adopted change tags, pointers, and/or other indicators identifying portions of the original documents that may be changed based on certain input and/or other criteria. In doing so, the first data storage system 103 and/or the second data storage system 104 may configure the one or more versions of the one or more original documents to update in a manner corresponding to any updates, changes, or modifications made to the one or more original documents.

Figure 2B:
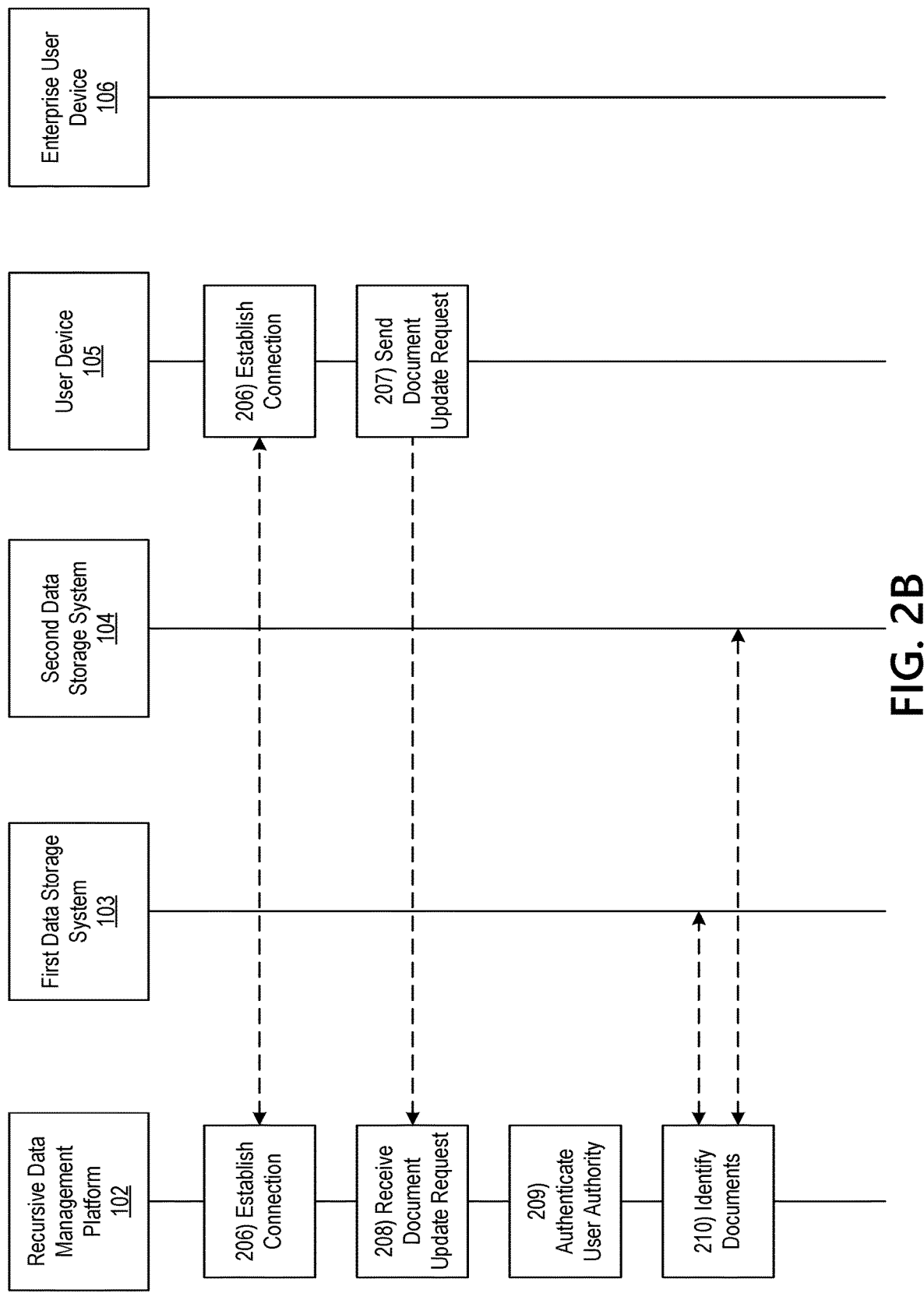

Referring to FIG. 2B, at step 206, the recursive data management platform 102 may establish a connection with the user device 105. For example, the recursive data management platform 102 may establish a third wireless data connection with the user device 105 to link the recursive data management platform 102 to the user device 105 (e.g., in preparation for sending/receiving document update requests). In some instances, the recursive data management platform 102 may identify whether or not a connection is already established with the user device 105. If a connection is already established, the recursive data management platform 102 might not re-establish the connection. If a connection is not yet established with the user device 105, the recursive data management platform 102 may establish the third wireless data connection as described herein.

At step 207, the user device 105 may send a document update request to the recursive data management platform 102. For example, the user device 105 may send a request to the recursive data management platform 102 to modify, update, or otherwise change one of the original documents.

In some instances, the user device 105 may send a request to update a particular document (and any corresponding versions of that particular document). Additionally or alternatively, the user device 105 may send a request to implement a particular change (e.g., change the name of an entity, remove an individual who is no longer employed by the enterprise, add the name of a new employee, and/or other changes), and might not specify a particular document that should be edited accordingly. In some instances, the user device 105 may send the document update request while the third wireless data connection is established.

At step 208, the recursive data management platform 102 may receive the document update request sent at step 207. For example, the recursive data management platform 102 may receive the document update request via the communication interface 113 and while the third wireless data connection is established.

At step 209, the recursive data management platform 102 may authenticate an authority of a user of the user device 105 to identify whether or not the user has authority to make the requested change. For example, the recursive data management platform 102 may identify access and/or edit permissions corresponding to the user device 105 and/or an account for the user, and may compare the requested change to what is authorized. In some instances, the recursive data management platform 102 may identify that the user is authorized to make certain changes within a document, but not others. In other instances, the recursive data management platform 102 may identify that the user is either fully authorized to edit a document, or fully prohibited from doing so. If the recursive data management platform 102 identifies that the user is not authorized to make the requested change, the event sequence may end. If instead, the recursive data management platform 102 identifies that the user is authorized to make the requested change, the recursive data management platform 102 may proceed to step 210.

In some instances, in addition or as an alternative to authenticating the user based on their credentials, the recursive data management platform 102 may identify whether any documents, for which a change is requested, are tagged as sensitive or otherwise unalterable. If an attempt to edit such a document is made, the recursive data management platform 102 may identify that the user is not authenticated to make the requested change.

In some instances, the recursive data management platform 102 may identify a type of changes that the user is authorized to make to any requested documents (e.g., substantive, cosmetic, and/or other changes). The recursive data management platform 102 may identify, in part, whether the user is authorized to make the requested changes based on these edit permissions.

In some instances, if the recursive data management platform 102 identifies that the user is not authorized to make the requested change, the recursive data management platform 102 may send a notification to an enterprise user device (e.g., enterprise user device 106) indicating that an unauthorized document modification request was made.

At step 210, the recursive data management platform 102 may identify one or more versions of the original documents, stored at the first data storage system 103 and/or the second data storage system 104, which should be changed in response to the requested change. For example, the recursive data management platform 102 may identify any existing versions of a document specified in the document update request (e.g., identify storage locations of existing versions). Additionally or alternatively, the recursive data management platform 102 may identify any documents affected by a requested change, and may identify the corresponding versions of those documents. In some instances, identifying the documents may include identifying documents stored at a plurality of different locations (e.g., first data storage system 103, second data storage system 104, and/or other data storage systems such as databases, drives, shared drivers, or the like).

In some instances, the recursive data management platform 102 may identify a number of documents that will be changed based on the document update request, and may notify the user prior to executing the update. For example, the recursive data management platform 102 may send a notification to the user device 105 that includes the number of affected documents and requests confirmation that the update should be made (e.g., the user might not want to implement a change if an unanticipated number of other documents will be affected as a result). In some instances, the recursive data management platform 102 may send this notification if the number of affected documents is equal to or exceeds a predetermined threshold, and might not send the notification if the number of affected documents does not exceed the threshold.

Referring to FIG. 2C, at step 211, the recursive data management platform 102 may retrieve or otherwise access the documents identified at step 210. For example, in some instances, the recursive data management platform 102 may access the documents in their various storage locations across the first data storage system 103, second data storage system 104, and/or other storage locations. In other instances, the recursive data management platform 102 may retrieve the documents from their various storage locations for editing at the recursive data management platform 102.

At step 212, the recursive data management platform 102 may identify document changes to be made within each of the identified documents. For example, the recursive data management platform 102 may identify document changes specified in the document update request and/or any corresponding changes (e.g., implementation of one change may inspire other changes or otherwise impact the document). For example, the recursive data management platform 102 may identify that, based on the requested changes, a classification of a particular document may be changed (e.g., from non-confidential, confidential, proprietary, or other classification change) and the header/footer (or other section) of a particular document should also be updated accordingly to reflect the updated classification. To do so, the recursive data management platform 102 may scan each of the identified documents to identify locations of one or more enterprise-adopted change tags or pointers indicating a portion (e.g., a name, a word, a paragraph, or other portion of the document) of the document to update. In these instances, the recursive data management platform 102 may maintain an index that indicates portions of each of the original documents to be updated, which may e.g., include links between the original document and the versions of the original document stored at various other sources. In some instances, the recursive data management platform 102 may periodically update this index. In some instances, the recursive data management platform 102 may perform a lookup function (e.g., based on a name, a signature, keywords, a file hash, key numbers for a paragraph or other portion of a document, hypertext, and/or other identifiers), word search, or other comparison method to identify particular words to be changed.

In some instances, in addition to identifying documents and changes based on the document update request as described above, the recursive data management platform 102 may automatically identify additional or alternative changes to be made based on changes in enterprise information (e.g., an enterprise policy change, an enterprise name change, a change in enterprise personnel, and/or other enterprise information). For example, an enterprise may experience a merger or acquisition, which may result in changing of such enterprise information. In these instances, the recursive data management platform 102 may identify original documents that include the enterprise information and all corresponding versions of these affected documents (and their corresponding locations), and portions of the versions of the affected documents to be changed (e.g., based on tags, pointers, lookups, or other methods).

In some instances, the recursive data management platform 102 may identify that one or more images, template changes, logos, and/or other document features should be updated or formatted based on the requested change At step 213, the recursive data management platform 102 may write the changes, identified at step 212, to the accessed documents. In some instances, the recursive data management platform 102 may lock the accessed documents for editing while changes are being written. In some instances, the recursive data management platform 102 may write the changes to the original versions of the accessed documents, which may cause the changes to proliferate throughout the other versions of the corresponding documents based on the one or more enterprise adopted change tags, pointers, and/or other indicators identifying portions of the original documents that may be changed (e.g., the recursive data management platform 102 may write the changes to the one or more enterprise-adopted change tags within the original documents). In some instances, the recursive data management platform 102 may perform a lookup function, word search, or other comparison method to identify particular words to be changed. For example, the recursive data management platform 102 may use these tags as links between the original documents and the corresponding versions now stored at other locations, which may cause any updates made to the original document to automatically be further made at the other document versions. Additionally or alternatively, the recursive data management platform 102 may cause the versions of the accessed documents to be deleted from the first data storage system 103, second data storage system 104, and/or other storage systems. In these instances, the recursive data management platform 102 may update the original versions of the accessed documents, and subsequently push out the updated versions to the first data storage system 103, second data storage system 104, and/or any other storage locations (e.g., effectively replacing the old versions of the documents rather than modifying them directly as described above).

At step 214, the recursive data management platform 102 may embed a signature of the user and/or a timestamp indicating when the change was written into the accessed documents. In doing so, the recursive data management platform 102 may maintain a log of who made what changes and when, which may be advantageous in the event of any malicious or unauthorized attempts to alter enterprise documents.

Figure 2D:
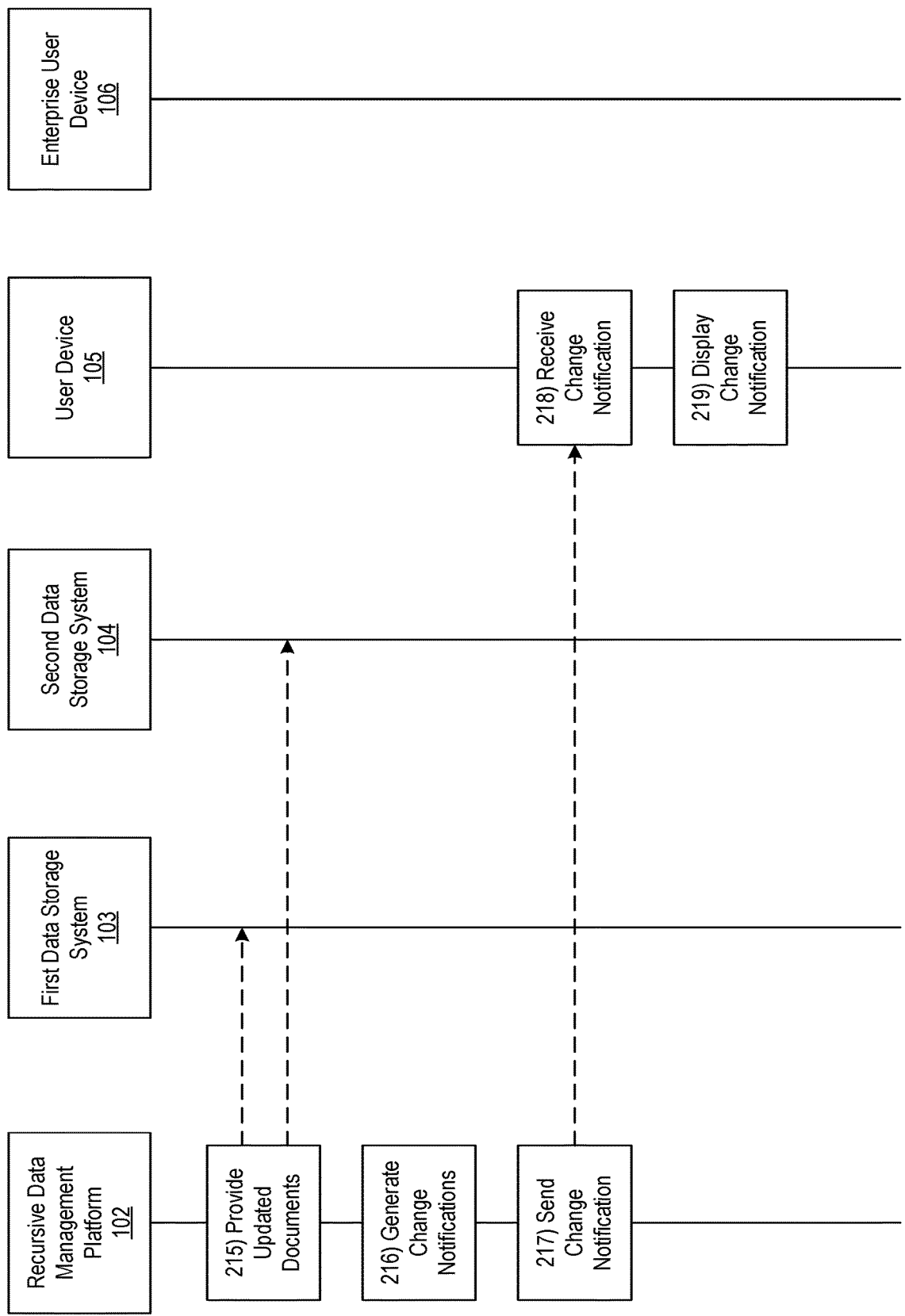

Referring to FIG. 2D, at step 215, if the documents were updated at the recursive data management platform 102 (or otherwise removed from the first data storage system 103, second data storage system 104, or other storage system), the recursive data management platform 102 may provide the updated documents to the first data storage system 103 and/or the second data storage system 104 (e.g., to replace old versions of the documents with new versions, updated based on the document update request).

At step 216, the recursive data management platform 102 may generate a change notification indicating that the requested document update has been performed and identifying any modified documents/corresponding modifications. At step 217, the recursive data management platform 102 may send the change notification to the user device 105. For example, the recursive data management platform 102 may send the change notification to the user device 105 via the communication interface 113 and while the third wireless data connection is established. In some instances, the recursive data management platform 102 may also send one or more commands directing the user device 105 to display the change notification.

At step 218, the user device 105 may receive the change notification sent at step 217. For example, the user device 105 may receive the change notification while the third wireless data connection is established. In some instances, the user device 105 may also receive the one or more commands directing the user device 105 to display the change notification.

Figure 4:
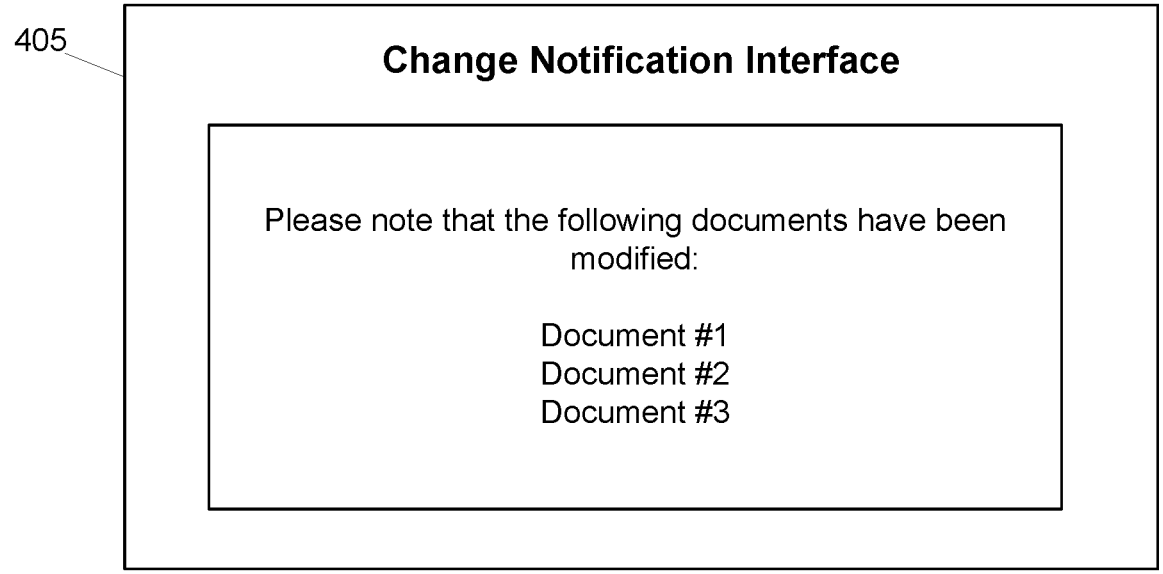
FIG. 4 depicts an illustrative graphical user interface for performing recursive data and electronic signature updates to documents in accordance with one or more example embodiments.

At step 219, based on or in response to the one or more commands directing the user device 105 to display the change notification, the user device 105 may display the change notification. For example, the user device 105 may display a graphical user interface similar to graphical user interface 405, which is illustrated in FIG. 4, and that identifies the modified documents.

Figure 2E:
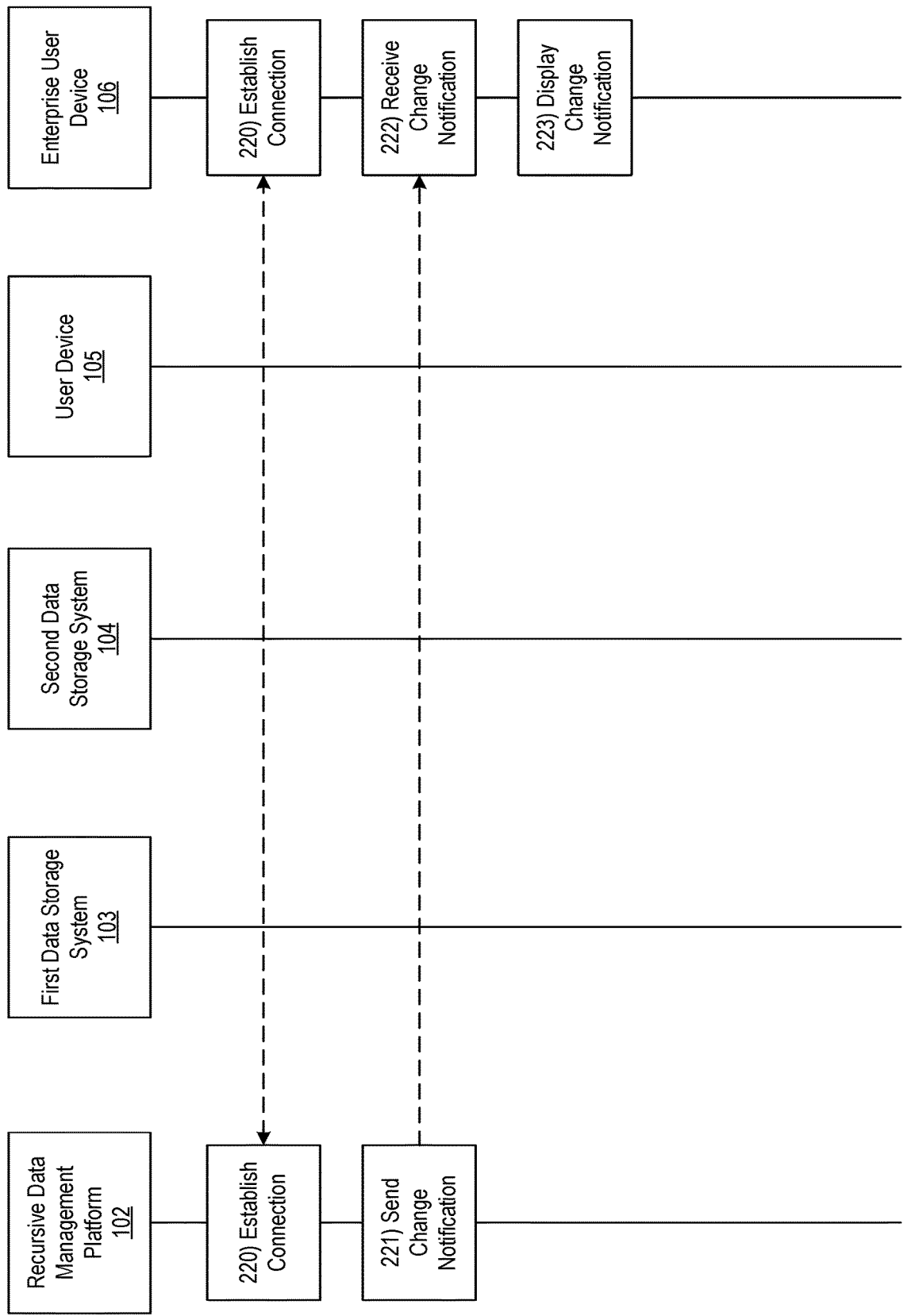

Referring to FIG. 2E, at step 220, the recursive data management platform 102 may establish a connection with the enterprise user device 106. For example, the recursive data management platform 102 may identify any relevant individuals and/or devices that should be notified of the document updates based on the content of the updates, the context of the updated documents, and/or otherwise should be notified (e.g., a network security administrator, security analyst, attorney, compliance analyst, and/or other enterprise employee). In some instances, the recursive data management platform 102 may establish a fourth wireless data connection with the enterprise user device 106 to link the recursive data management platform 102 with the enterprise user device 106 (e.g., in preparation for sending a change notification). In some instances, the recursive data management platform 102 may identify whether or not a connection is already established with the enterprise user device 106. If a connection is established with the enterprise user device 106, the recursive data management platform 102 might not re-establish the connection. If a connection is not yet established with the enterprise user device 106, the recursive data management platform 102 may establish the fourth wireless data connection as described herein.

At step 221, the recursive data management platform 102 may send a change notification (which may e.g., be the same notification or a different notification than the notification sent at step 217) to the enterprise user device 106. For example, the recursive data management platform 102 may send the change notification to the enterprise user device 106 via the communication interface 113 and while the fourth wireless data connection is established. In some instances, the recursive data management platform 102 may also send one or more commands directing the enterprise user device 106 to display the change notification.

At step 222, the enterprise user device 106 may receive the change notification sent at step 221. For example, the enterprise user device 106 may receive the change notification while the fourth wireless data connection is established.

In some instances, the enterprise user device 106 may also receive the one or more commands directing the enterprise user device 106 to display the change notification.

At step 223, based on or in response to the one or more commands directing the enterprise user device 106 to display the change notification, the enterprise user device 106 may display the change notification. For example, the enterprise user device 106 may display a graphical user interface similar to graphical user interface 405, which is shown in FIG. 4.

Although a first data storage system 103 and second data storage system 104 are described above, this is for illustrative purposes only, and any number of data storage systems may be deployed in the methods described above without departing from the scope of this disclosure. Furthermore, although the recursive data management platform 102 is described as a server separate from the user devices, in some instances, the methods described above may be deployed in a peer-to-peer fashion, where the services provided by the recursive data management platform 102 as described above may be performed by a user device (e.g., user device 105, enterprise user device 106, or other user device).

Figure 3:
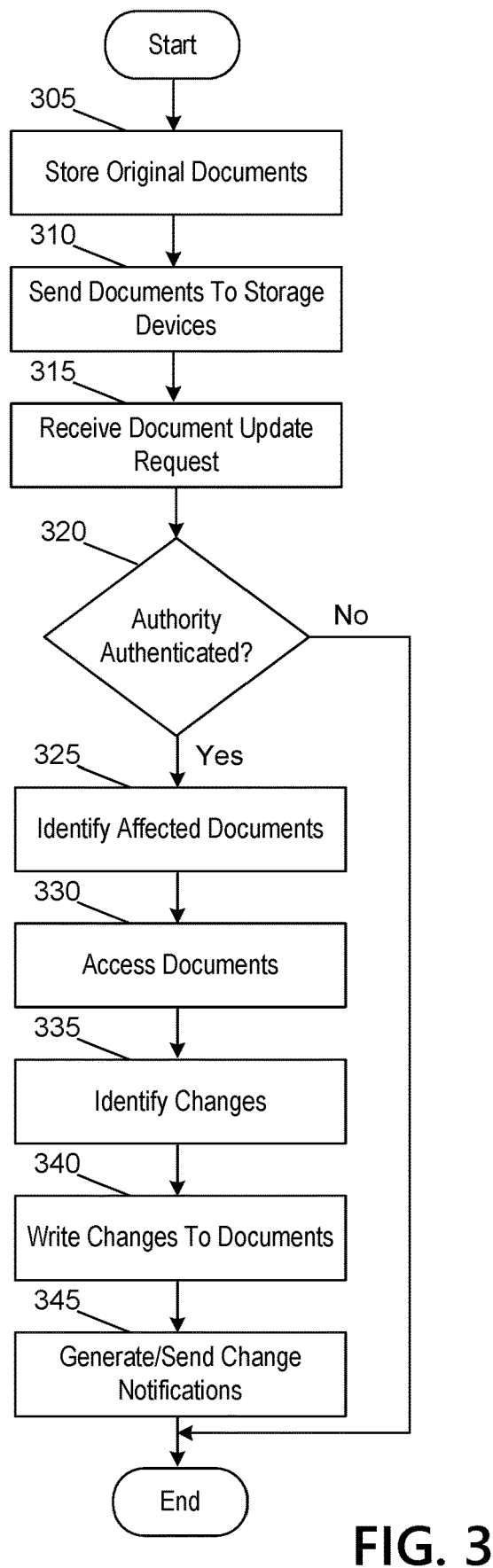
FIG. 3 depicts an illustrative method for performing recursive data and electronic signature updates to documents in accordance with one or more example embodiments.

FIG. 3 depicts an illustrative method for performing recursive data and electronic signature updates to documents in accordance with one or more example embodiments. Referring to FIG. 3, at step 305, a computing platform having at least one processor, a communication interface, and memory may store one or more original documents. At step 310, the computing platform may send versions of the one or more original documents to various storage devices. At step 315, the computing platform may receive a document update request. At step 320, the computing platform may identify whether or not the user requesting the update has authority to make the requested update. If the user requesting the update does not have authority to make the requested update, the document update request may be denied and the method may end. If the user requesting the update does have authority to make the requested update, the computing platform may proceed to step 325 to identify documents affected by the requested change. At step 330, the computing platform may access the identified documents. At step 335, the computing platform may identify changes to be made to the identified documents. At step 340, the computing platform may write the identified changes to the identified documents. At step 345, the computing platform may generate and send change notifications indicating that the requested update has been performed.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
receive, from a user device, a document change request;
authenticate authority of a user of the user device to perform the document change request;
based on authenticating the authority of the user of the user device to perform the document change request:
identify, based on enterprise information, additional changes to be made, wherein the document change request indicates a change from a name of a first organization to a name of a second organization, wherein the enterprise information indicates an agreement between the first organization and a third organization, and identify a plurality of storage locations at which documents that are affected by the document change request are located, wherein identifying the plurality of storage locations at which the documents that are affected by the document change request are located is further based on the additional changes, and wherein the documents include documents containing the agreement;

access the documents at each of the plurality of storage locations;

scan the documents to identify locations, within the documents, of changes to be made, wherein scanning the documents comprises identifying the locations based on one or more enterprise-adopted change tags;

write the changes to the documents at the identified locations based on the one or more enterprise-adopted change tags;

embed, in the documents, a timestamp corresponding to implementation of the changes and a signature of the user; and send, to the user device, a change notification, indicating that the document change request has been completed, and one or more commands directing the user device to display the change notification, wherein sending the one or more commands directing the user device to display the change notification causes the user device to display the change notification and information associated with the one or more enterprise-adopted change tags.

2. The computing platform of claim 1, wherein the memory stores additional computer-readable instructions that, when executed by the at least one processor, cause the computing platform to:

store one or more original documents; and embed, into the one or more original documents, the one or more enterprise-adopted change tags indicating portions of the one or more original documents to be modified upon receipt of each of a plurality of requested document changes.

3. The computing platform of claim 2, wherein writing the changes to the documents comprises writing to the one or more enterprise-adopted change tags of original documents linked to the documents, the changes.

4. The computing platform of claim 1, wherein the document change request indicates a particular document to be modified.

5. The computing platform of claim 4, wherein identifying the plurality of storage locations at which the documents that are affected by the document change request are located comprises identifying storage locations of available versions of the particular document.

6. The computing platform of claim 1, wherein the document change request indicates a particular change to be made.

7. The computing platform of claim 6, wherein identifying the plurality of storage locations at which the documents that are affected by the document change request are located comprises identifying documents including information to be changed based on the particular change.

8. The computing platform of claim 1, wherein the memory stores additional computer-readable instructions that, when executed by the at least one processor, cause the computing platform to:

identify, based on enterprise information, additional changes to be made, wherein identifying the plurality of storage locations at which the documents that are affected by the document change request are located is further based on the additional changes.

9. The computing platform of claim 8, wherein the enterprise information indicates one or more of: an enterprise policy change or an enterprise name change.

10. The computing platform of claim 1, wherein the memory stores additional computer-readable instructions that, when executed by the at least one processor, cause the computing platform to:

lock, while the changes are being written to the documents at the identified locations based on the one or more enterprise-adopted change tags, the documents for editing.

11. The computing platform of claim 1, wherein the document change request comprises a request to change one or more of a document template or logo.

12. The computing platform of claim 1, wherein the memory stores additional computer-readable instructions that, when executed by the at least one processor, cause the computing platform to:

reclassify, based on the changes to the documents, one or more of the documents; and update, based on the reclassification, one or more of a header or a footer in the one or more documents indicating the reclassification.

13. The computing platform of claim 1, wherein the documents are not specified in the document change request.

14. The computing platform of claim 1, wherein the memory stores additional computer-readable instructions that, when executed by the at least one processor, cause the computing platform to:

identify whether or not a number of the documents to which the change should be written meets or exceeds a predetermined threshold;

based on identifying that the number of the documents does not meet or exceed the predetermined threshold, automatically writing the change to the documents; and based on identifying that the number of the documents does meet or exceed the predetermined threshold, prompting for confirmation before writing the change to the documents, wherein writing the change to the documents is in response to receiving the confirmation.

15. A method comprising:

at a computing platform comprising at least one processor, a communication interface, and memory:

receiving, from a user device, a document change request;

authenticating authority of a user of the user device to perform the document change request;

based on authenticating the authority of the user of the user device to perform the document change request:

identifying, based on enterprise information, additional changes to be made, wherein the document change request indicates a change from a name of a first organization to a name of a second organization, wherein the enterprise information indicates an agreement between the first organization and a third organization, and identifying a plurality of storage locations at which documents that are affected by the document change request are located, wherein identifying the plurality of storage locations at which the documents that are affected by the document change request are located is further based on the additional changes, and wherein the documents include documents containing the agreement;

accessing the documents at each of the plurality of storage locations;

scanning the documents to identify locations, within the documents, of changes to be made, wherein scanning the documents comprises identifying the locations based on one or more enterprise-adopted change tags;

writing the changes to the documents at the identified locations based on the one or more enterprise-adopted change tags;

embedding, in the documents, a timestamp corresponding to implementation of the changes and a signature of the user; and sending, to the user device, a change notification, indicating that the document change request has been completed, and one or more commands directing the user device to display the change notification, wherein sending the one or more commands directing the user device to display the change notification causes the user device to display the change notification and information associated with the one or more enterprise-adopted change tags.

16. The method of claim 11, wherein the document change request indicates a particular change to be made.

17. The method of claim 16, wherein identifying the plurality of storage locations at which the documents that are affected by the document change request are located comprises identifying documents including information to be changed based on the particular change.

18. The method of claim 11, wherein the memory stores additional computer-readable instructions that, when executed by the at least one processor, cause the computing platform to:

identify, based on enterprise information, additional changes to be made, wherein identifying the plurality of storage locations at which the documents that are affected by the document change request are located is further based on the additional changes.

19. The method of claim 18, wherein the enterprise information indicates one or more of: an enterprise policy change or an enterprise name change.

20. One or more non-transitory computer-readable media storing instructions that, when executed by a computing platform comprising at least one processor, a communication interface, and memory, cause the computing platform to:

receive, from a user device, a document change request;

authenticate authority of a user of the user device to perform the document change request;

based on authenticating the authority of the user of the user device to perform the document change request:

identify, based on enterprise information, additional changes to be made, wherein the document change request indicates a change from a name of a first organization to a name of a second organization, wherein the enterprise information indicates an agreement between the first organization and a third organization, and identify a plurality of storage locations at which documents that are affected by the document change request are located, wherein identifying the plurality of storage locations at which the documents that are affected by the document change request are located is further based on the additional changes, and wherein the documents include documents containing the agreement;

access the documents at each of the plurality of storage locations;

scan the documents to identify locations, within the documents, of changes to be made, wherein scanning the documents comprises identifying the locations based on one or more enterprise-adopted change tags;

write the changes to the documents at the identified locations based on the one or more enterprise-adopted change tags;

embed, in the documents, a timestamp corresponding to implementation of the changes and a signature of the user; and send, to the user device, a change notification, indicating that the document change request has been completed, and one or more commands directing the user device to display the change notification, wherein sending the one or more commands directing the user device to display the change notification causes the user device to display the change notification and information associated with the one or more enterprise-adopted change tags.

* * * * *